(12) United States Patent
Lindoff

(10) Patent No.: US 8,509,104 B2
(45) Date of Patent: Aug. 13, 2013

(54) IDENTIFYING A SEQUENCE OF RECEIVED SIGNALS

(75) Inventor: Bengt Lindoff, Bjärred (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 250 days.

(21) Appl. No.: 12/810,839

(22) PCT Filed: Nov. 19, 2008

(86) PCT No.: PCT/EP2008/065853
§ 371 (c)(1),
(2), (4) Date: Feb. 3, 2011

(87) PCT Pub. No.: WO2009/083336
PCT Pub. Date: Jul. 9, 2009

(65) Prior Publication Data
US 2011/0128872 A1   Jun. 2, 2011

Related U.S. Application Data

(60) Provisional application No. 61/018,550, filed on Jan. 2, 2008.

(30) Foreign Application Priority Data

Dec. 28, 2007 (EP) .................................. 07388090

(51) Int. Cl.
*H04J 11/00* (2006.01)
(52) U.S. Cl.
USPC .......................................................... 370/252
(58) Field of Classification Search
USPC .............................................. 370/252, 328
See application file for complete search history.

(56) References Cited

U.S. PATENT DOCUMENTS

| 6,754,251 | B1 | 6/2004 | Sriram et al. |
| 2003/0119444 | A1 | 6/2003 | Yamaguchi |
| 2005/0163238 | A1 | 7/2005 | Fujii |
| 2006/0285484 | A1* | 12/2006 | Papasakellariou et al. ... 370/208 |
| 2007/0177691 | A1* | 8/2007 | Ruprich ......................... 375/321 |
| 2007/0183370 | A1* | 8/2007 | Wallace et al. ............... 370/333 |
| 2007/0270273 | A1 | 11/2007 | Fukuta et al. |
| 2009/0054094 | A1* | 2/2009 | Demir et al. .................. 455/502 |
| 2010/0103906 | A1* | 4/2010 | Montojo et al. .............. 370/335 |

OTHER PUBLICATIONS

PCT International Search Report, dated Jan. 30, 2009, in connection with International Application No. PCT/EP2008/065853.

(Continued)

*Primary Examiner* — Andrew Lai
*Assistant Examiner* — Zhiren Qin
(74) *Attorney, Agent, or Firm* — Potomac Patent Group PLLC

(57) ABSTRACT

A sequence of received signals is identified, by a receiver of signals transmitted via a channel of a wireless communications system, as one of a number of known orthogonal sequences. The sequence of received signals is received; a modified sequence is calculated by replacing some of the received signals by their complex conjugate values; the modified sequence is correlated with each one of the number of known orthogonal sequences to obtain a correlation result for each of the known sequences; and the sequence of received signals is identified as the known sequence having the largest correlation result. When some signals in the received sequence are complex conjugated before being correlated with the known sequences, the correlation sum will increase so that even in case of a considerable frequency error the correlation sum for the correct sequence will be sufficiently large to be distinguished from noise.

15 Claims, 7 Drawing Sheets

(56) References Cited

OTHER PUBLICATIONS

Sharma, D. et al. "Fast Cell Synchronization for Beyond 3G OFDMA based System" 2006 IFIP International Conference on Wireless and Optical Communications Networks, Bangalore, India, Apr. 11-13, 2006, Piscataway, NJ, USA, IEEE, Apr. 11, 2006, pp. 1-5, XP010933856, ISBN: 978-1-4244-0340-0.

PCT International Preliminary Report on Patentability, completed Jun. 29, 2010, in connection with International Application No. PCT/EP2008/065853.

* cited by examiner

IDENTIFYING A SEQUENCE OF RECEIVED SIGNALS

CROSS-REFERENCE TO RELATED APPLICATIONS

This application claims priority under 35 U.S.C. §119 to European Patent Application No. 07388090.8, filed Dec. 28, 2007, which is hereby incorporated herein by reference in its entirety. This application also claims the benefit of U.S. Provisional Application No. 61/018,550, filed Jan. 2, 2008, which is hereby incorporated herein by reference in its entirety.

TECHNICAL FIELD

The invention relates to a method of identifying, by a receiver of signals transmitted via a channel of a wireless communications system, a sequence of received signals as one of a number of known orthogonal sequences.

BACKGROUND

In the forthcoming evolution of the mobile cellular standards like Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from existing cellular systems to the new high capacity high data rate system in existing radio spectrum, the new system has to be able to operate in a flexible bandwidth. A proposal for such a new flexible cellular system is Third Generation (3G) Long Term Evolution (3G LTE) that can be seen as an evolution of the 3G WCDMA standard. This system will use OFDM as multiple access technique (called OFDMA) in the downlink and will be able to operate on bandwidths ranging from 1.25 MHz to 20 MHz. Furthermore, data rates up to 100 Mb/s will be supported for the largest bandwidth.

One important aspect of 3G LTE is the mobility function, hence synchronization symbols and cell search procedures are of major importance in order for user equipment to detect and synchronize with other cells. Cell search is a procedure by which a user equipment can find a cell for potential connection to. In this procedure, the user equipment detects the identity of the cell and estimates the frame timing of the identified cell. The cell search procedure also provides estimates of parameters needed for reception of system information on the broadcast channel. In 3G LTE, 510 different cell identities are supported, which can be divided into 170 cell identity groups of three identities each.

It is noted that 3G LTE supports both frequency- and time-division-based duplex. Frequency Division Duplex (FDD) implies that downlink and uplink transmission takes place on different frequency bands, while Time Division Duplex (TDD) implies that downlink and uplink transmission take place in different, non-overlapping time slots.

The time domain structure for 3G LTE transmission defines a frame of 10 ms length consisting of ten equally sized subframes of length 1 ms. Each 1 ms subframe consists of two equally sized slots of length 0.5 ms, and each slot consists of a number (normally seven) of OFDM symbols. The first and sixth subframes of each frame include synchronization signals, which are transmitted on the downlink of each cell for use in the cell search procedure. A primary synchronization signal and a secondary synchronization signal are provided, which for FDD are specific sequences that are inserted into the last two OFDM symbols in the first slot of the first and sixth subframes. For TDD, the secondary synchronization signal is transmitted in the last symbol of the first and sixth subframes, and the primary synchronization signal is transmitted in the first symbol of the next slot.

As the transmission is based on OFDM, the basic LTE downlink physical resource can be seen as a time-frequency resource grid, where each resource element corresponds to one OFDM subcarrier during one OFDM symbol interval. The subcarriers are grouped into resource blocks, where each resource block consists of 12 consecutive subcarriers during a 0.5 ms slot, i.e. each resource block consists of 12·7=84 resource elements in the normal case.

To enable channel estimation, known reference symbols are inserted into the OFDM time-frequency grid. They are inserted within the first and the third last OFDM symbols of each slot and with a frequency-domain spacing of six subcarriers, and there is a frequency-domain staggering of three subcarriers between the first and second reference symbols. Thus there are four reference symbols within each resource block. The reference symbols are also referred to as CQI (Channel Quality Indicator) pilots.

The complex values of the reference symbols will vary between different reference symbol positions and between different cells. The LTE reference signal sequence can be seen as an indicator of the cell identity. Each reference signal sequence can be considered as a product of a two-dimensional pseudo-random sequence and a two-dimensional orthogonal sequence. The LTE specification defines a total of 170 different pseudo-random sequences, each corresponding to one out of 170 cell identity groups. There are defined three orthogonal sequences, each corresponding to a specific cell identity within each cell identity group.

As mentioned, a cell search procedure is used by a receiver to detect and synchronize to a new or another cell. To reduce the cell search complexity, the currently proposed cell search scheme for LTE is done in several steps.

In the first step, the primary synchronization signal is used to detect the timing on a 5 ms basis for a new cell. Since the primary synchronization signal is transmitted twice in each frame, it can only provide the frame timing with a 5 ms ambiguity.

In the second step, the frame timing is determined from the secondary synchronization signal by observing pairs of slots where the secondary synchronization signal is transmitted. Also the cell identity group is detected in this step.

Next, in the third step, the full cell identity is detected from the reference symbols by determining the orthogonal sequence used for the transmitted reference symbols. This is done by correlating a received sequence of reference symbols with each one of the possible known orthogonal sequences and identifying the received as the known sequence giving the largest correlation result.

Finally, when the cell search procedure is complete, the Broadcast channel is read to receive broadcasted cell specific system information.

The first two steps are well known in the art and similar to the cell search scheme in WCDMA. Also a step similar to the third step is used in WCDMA, where the pilot signal (CPICH) is scrambled with a pseudo-random sequence determining the cell ID. By assuming that the channel that affects the pilot signal over a certain interval (one to two slots in WCMDA) is constant, the scrambling sequence can be detected easily. In 3G LTE, the idea is to scramble the reference symbols with a pseudo-random sequence to discriminate between cells in different cell groups and then apply orthogonal sequences on the reference symbols, where the orthogonality is within the cell group. However, in contrast to WCDMA, LTE does not have strong continuous pilots channel, but relies on fewer reference symbols as mentioned above. These reference symbols are placed in the first and third last OFDM symbol in each subframe, and placed on every sixth carrier, i.e. with a distance of 90 kHz between the pilots.

A problem using pilot symbols that are transmitted on different sub-carriers for scrambling code identification is that the phases for the different sub-carriers typically are affected in a different and unknown way. This means that coherent alignment of the pilots is not feasible without channel equalization making the scrambling detection procedure much harder in LTE.

Furthermore, in order to have coherence gain, reference symbols used for cell identity detection will be spread out on a relative long time scale (1 ms) making the cell identity detection also sensitive to frequency errors. Frequency errors may make it difficult or even impossible to determine the orthogonal sequence used for the transmitted reference symbols, since the correlation results may be severely affected by a frequency error. Also in other communications systems, a received sequence needs to be identified, even in case of frequency error.

Consequently, there is a need for a way of identifying a received sequence as one of a number of known sequences, which is robust against frequency errors.

SUMMARY

Therefore, it is an object of the invention to provide a method of identifying in a receiver a sequence of received signals as one of a number of known orthogonal sequences, which provides good results also in case of a frequency error in the received signals.

According to the invention the object is achieved in a method of identifying, by a receiver of signals transmitted via a channel of a wireless communications system, a sequence of received signals as one of a number of known orthogonal sequences. The method comprises the steps of receiving said sequence of received signals serially over a given time interval; receiving, in addition to said sequence of received signals, at least one known signal at a time instant in said given time interval; dividing said sequence of received signals into a first part comprising signals received before said time instant and a second part comprising signals received after said time instant; calculating from said sequence of received signals a modified received sequence by replacing at least one of the received signals from one of said parts by their complex conjugate values; correlating the modified received sequence with each one of the number of known orthogonal sequences to obtain a correlation result for each of said known sequences; and identifying the sequence of received signals as the known orthogonal sequence having the largest correlation result.

When some of the signals in the received sequence are complex conjugated before being correlated with the known sequences, the correlation sum will increase with the result that even in case of a considerable frequency error the correlation sum for the correct sequence will be sufficiently large to be distinguished from noise. Since the frequency error is normally relatively constant, or at least does not change its sign during the time of reception for the signals, the phase change of a replaced signal from one part after the conjugation step will be of the same sign as the signals from the other part, which increases the correlation result.

The correlating step may comprise the steps of calculating for each of said known orthogonal sequences a modified known sequence by replacing signals corresponding to the replaced received signals by their complex conjugate values; and correlating the modified received sequence with each modified known sequence to obtain said correlation results. This is useful when the signal values of the known orthogonal sequences are complex. When these values are real, these steps are not needed.

When the method further comprises the steps of calculating from said known signal an estimate of said channel at said time instant; and equalizing said sequence of received signals using said channel estimate, a simpler method is achieved, because the effect of the channel is balanced out before the correlation process takes place, and thus calculation capacity is saved.

In one embodiment the method may be a method of determining, by a receiver of signals transmitted via a channel of a wireless communications system, a cell identity by a cell search algorithm, wherein the cell identity is determined by identifying a sequence of received signals as one of a number of known orthogonal sequences. This is the case when the communications system uses one of these known sequences to indicate the cell identity.

This would be the case when the receiver is a receiver of a Third Generation Long Term Evolution system.

As mentioned, the invention also relates to a receiver of signals transmitted via a channel of a wireless communications system, said receiver being arranged to identify a sequence of received signals as one of a number of known orthogonal sequences, wherein the receiver is further arranged to receive said sequence of received signals serially over a given time interval; receive, in addition to said sequence of received signals, at least one known signal at a time instant in said given time interval; divide said sequence of received signals into a first part comprising signals received before said time instant and a second part comprising signals received after said time instant; calculate from said sequence of received signals a modified received sequence by replacing at least one of the received signals from one of said parts by their complex conjugate values; correlate the modified received sequence with each one of the number of known orthogonal sequences to obtain a correlation result for each of said known sequences; and identify the sequence of received signals as the known (orthogonal) sequence having the largest correlation result. In this way the receiver can identify a sequence of received signals as one of a number of known orthogonal sequences with good results also in case of a frequency error in the received signals.

Embodiments corresponding to those mentioned above for the method also apply for the receiver.

In one embodiment, the receiver may further be arranged to determine an indication of a frequency error for signals transmitted via said channel; and calculate and correlate said modified received sequence in dependence of said indication. In this way the use of the extra step of conjugating some of the received signals can be limited to those situations where it is required due to a large frequency error. This can be done, e.g. when the receiver is further arranged to calculate and correlate said modified received sequence, if said indication exceeds a predefined threshold; and correlate said sequence of received signals with each one of the number of known orthogonal sequences to obtain a correlation result for each of said known sequences otherwise.

In another embodiment, the receiver is further arranged to determine a type of said cell search algorithm; and calculate and correlate said modified sequence in dependence of said type. This can be done, e.g. when the receiver is further arranged to calculate and correlate said modified sequence, if said cell search algorithm is an initial search algorithm; and correlate said sequence of received signals with each one of the number of known orthogonal sequences to obtain a correlation result for each of said known sequences otherwise.

The invention also relates to a computer program and a computer readable medium with program code means for performing the method described above.

BRIEF DESCRIPTION OF THE DRAWINGS

The invention will now be described more fully below with reference to the drawings, in which.

DETAILED DESCRIPTION

In Orthogonal Frequency Division Multiplexing (OFDM) systems a multi carrier approach, in which an original data stream to be transmitted from a transmitter to a receiver is multiplexed into a number of parallel data streams with a correspondingly low symbol rate, is used to reduce inter symbol interference (ISI) by reducing the symbol rate without reducing the data rate. The inter symbol interference is caused by delay spread of the channel impulse response for the multipath channel over which the signals are transmitted. Each of the parallel data streams are modulated with a different sub-carrier frequency and the resulting signals are transmitted together in the same band from a transmitter to a receiver. Typically, a high number of different sub-carrier frequencies, i.e. several hundreds or even thousands, will be used, and these frequencies will be very close to each other. In the receiver a Fast Fourier Transform (FFT) is used for separating the parallel data streams and recovering the original data stream.

3G Long Term Evolution (3G LTE) is a proposal for a new flexible mobile cellular system using OFDM as multiple access technique in the downlink. The description below uses 3G LTE as an example, but it is noted that other systems transmitting parallel data streams on corresponding sub-carriers can be used as well.

It is noted that 3G LTE supports both frequency- and time-division-based duplex. Frequency Division Duplex (FDD) implies that downlink and uplink transmission takes place on different frequency bands, while Time Division Duplex (TDD) implies that downlink and uplink transmission take place in different, non-overlapping time slots.

Figure 1A:
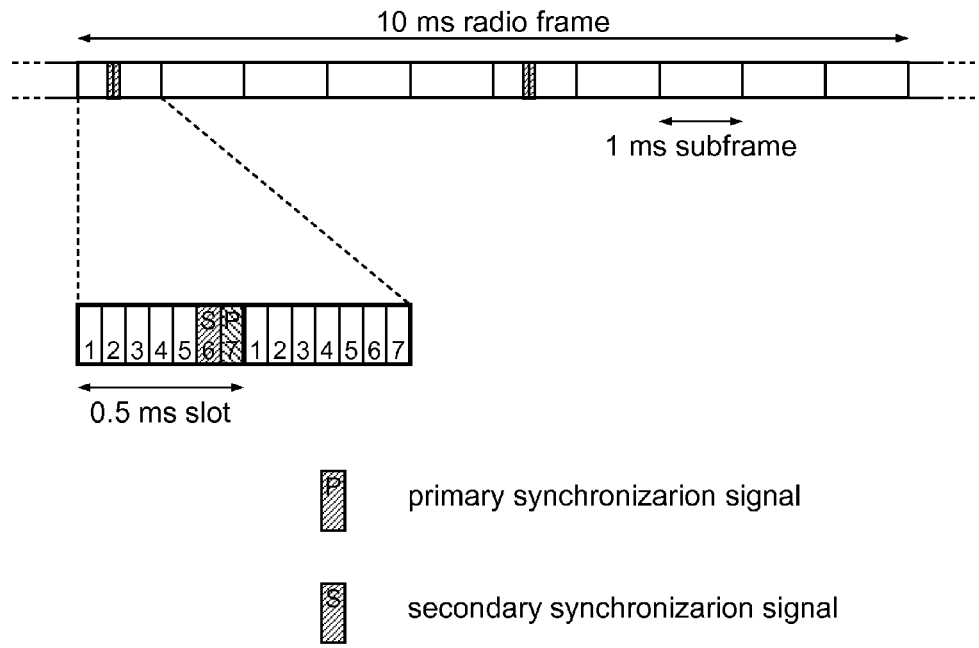
FIGS. 1a and 1b illustrate the time domain structure for 3G LTE transmission.
Figure 1B:
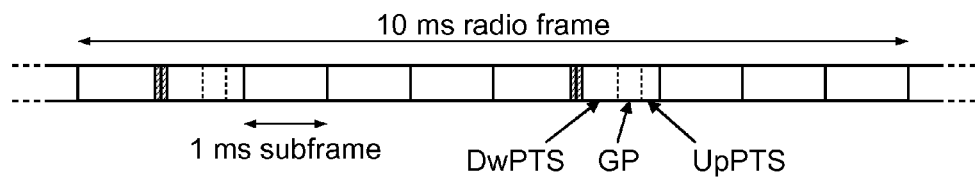

FIG. 1a illustrates the time domain structure for 3G LTE transmission in the case of FDD, which defines a frame of 10 ms length consisting of ten equally sized subframes of length 1 ms. Each 1 ms subframe consists of two equally sized slots of length 0.5 ms, and each slot consists of a number (normally seven) of OFDM symbols. The first and sixth subframes of each frame include synchronization signals, which are transmitted on the downlink of each cell for use in the cell search procedure. A primary synchronization signal (P-SCH) and a secondary synchronization signal (S-SCH) are provided, which are specific sequences that are inserted into the last two OFDM symbols in the first slot of the first and sixth subframes. FIG. 1b illustrates the corresponding time domain structure for 3G LTE transmission in the case of TDD, where the secondary synchronization signal is transmitted in the last symbol of the first and sixth subframes, and the primary synchronization signal is transmitted in the first symbol of the next slot, which is also called the DwPTS slot. In this slot the switch between downlink and uplink transmission occurs.

Figure 2:
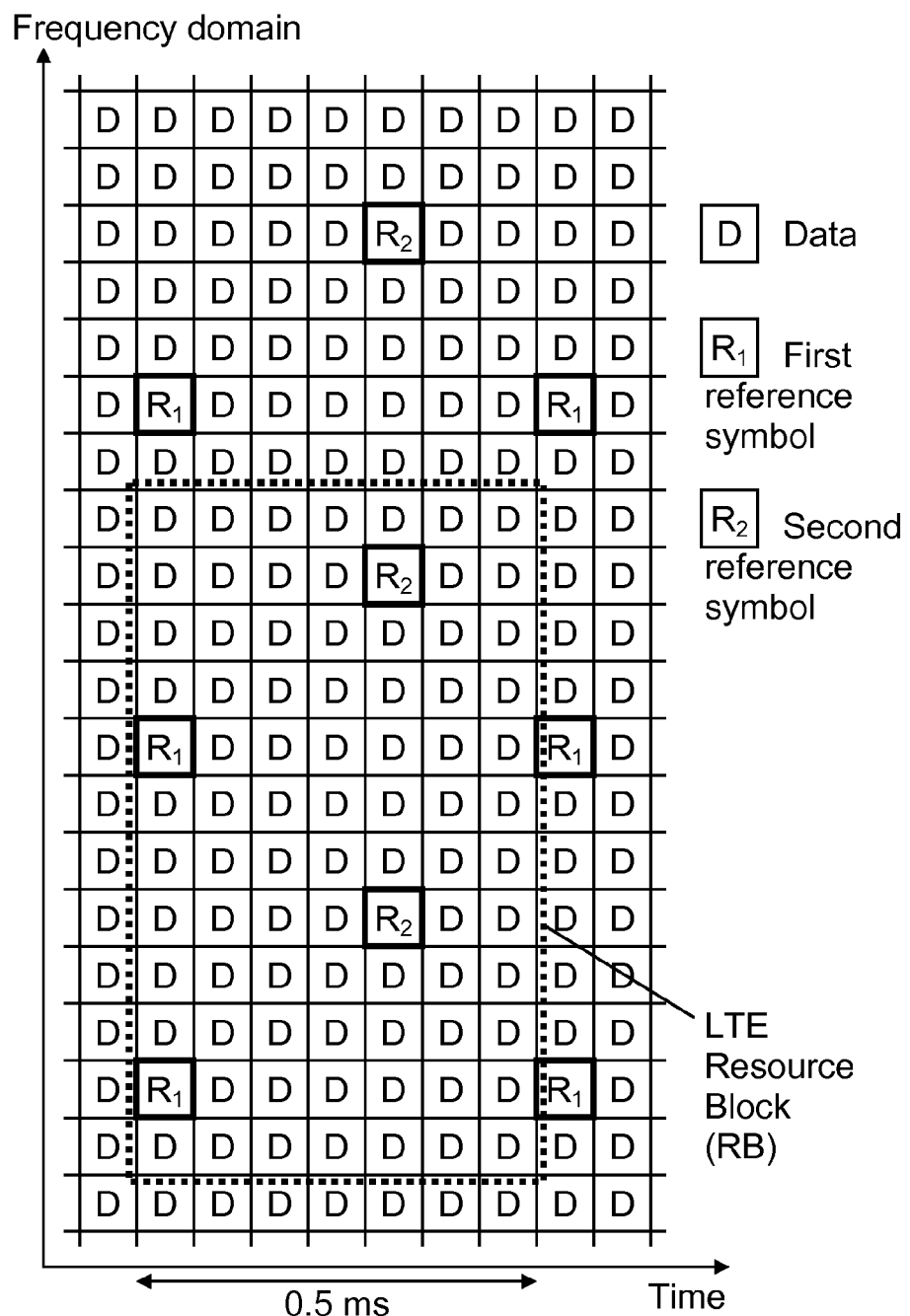
FIG. 2 shows a pilot pattern for a 3G LTE system.

As the transmission is based on OFDM, the basic LTE downlink physical resource can be seen as a time-frequency resource grid, where each resource element corresponds to one OFDM subcarrier during one OFDM symbol interval. The subcarriers are grouped into resource blocks, where each resource block consists of 12 consecutive subcarriers during a 0.5 ms slot, i.e. each resource block consists of 12·7=84 resource elements in the normal case. This is illustrated in FIG. 2, which also shows the location of the first and second reference symbols.

To enable channel estimation, known reference symbols are inserted into the OFDM time-frequency grid. They are inserted within the first and the third last OFDM symbols of each slot and with a frequency-domain spacing of six subcarriers, and there is a frequency-domain staggering of three subcarriers between the first and second reference symbols. Thus there are four reference symbols within each resource block, as it is also shown in FIG. 2. The reference symbols are also referred to as CQI (Channel Quality Indicator) pilots.

The complex values of the reference symbols will vary between different reference symbol positions and between different cells. The LTE reference signal sequence can be seen as an indicator of the cell identity. Each reference signal sequence can be considered as a product of a two-dimensional pseudo-random sequence and a two-dimensional orthogonal sequence. The LTE specification defines a total of 170 different pseudo-random sequences, each corresponding to one out of 170 cell identity groups. There are defined three orthogonal sequences, each corresponding to a specific cell identity within each cell identity group.

As mentioned above, the orthogonal sequence used for a sequence of transmitted reference symbols is to be determined in a receiver for detecting the cell identity of a new or another cell in the third step of a cell search procedure. This is done by correlating a received sequence of reference symbols with each one of the possible known orthogonal sequences and identifying the received as the known sequence giving the largest correlation result.

The reference symbols are scrambled with a pseudo-random sequence to discriminate between cells in different cell groups and then orthogonal sequences are applied on the reference symbols, where the orthogonality is within the cell group.

When pilot symbols transmitted on different sub-carriers for scrambling code identification are used, the phases for the different sub-carriers are typically affected in a different and unknown way. This means that coherent alignment of the pilots is not feasible without channel equalization making the scrambling detection procedure much harder in LTE.

Furthermore, in order to have coherence gain, reference symbols used for cell identity detection will be spread out on a relative long time scale (1 ms) making the cell identity detection also sensitive to frequency errors. Frequency errors may make it difficult or even impossible to determine the orthogonal sequence used for the transmitted reference symbols, since the correlation results may be severely affected by a frequency error.

A way of identifying a received sequence as one of a number of known sequences, which is robust against frequency errors, is described below. In the example, a frequency error robust correlation is applied in the cell ID detection in LTE cell search stage 3. In initial cell search, the remaining frequency error after stage 1 (P-SCH detection) can be quite large (>500 Hz). Still S-SCH detection can be done and a phase reference for stage 3 can be obtained but stage 3 cell ID will fail as described above. As it is described below for initial cell search, the cell identity detection in the user equipment can be made more robust to large frequency errors by correlating half the orthogonal cell identity code to one part of the received signal and the other half to the complex conjugate of another part of the received signal.

Figure 3:
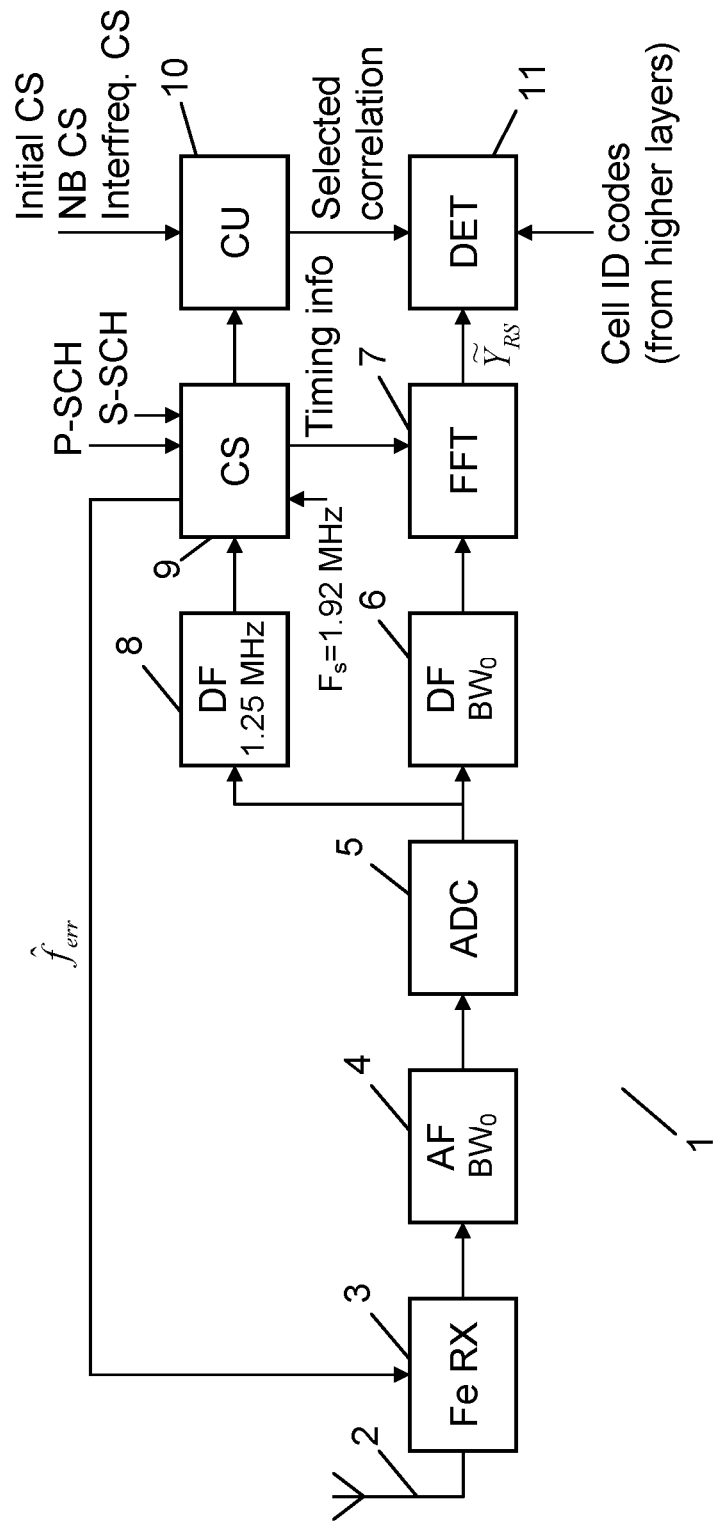
FIG. 3 shows a block diagram of a receiver circuit in which a sequence of received signals can be identified.

A block diagram of a receiver circuit 1 of a mobile station in which the invention can be used is shown in FIG. 3. In the Figure, the signal is received through the antenna 2 and down-converted in a front end receiver 3. The signal bandwidth is filtered out in the analog filter 4 and then converted to a digital base band signal in the analog-to-digital converter 5. The digital base band signal is then digitally filtered in the digital filter 6 and fed to the FFT 7. The signal out from the analog-to-digital converter 5 is also fed to a smaller digital filter 8 filtering out the synchronization signal bandwidth (here 1.25 MHz assumed, i.e. the assumed LTE synchronization signal bandwidth). The filtered signal is fed to the cell search unit 9 that does the cell search P-SCH and S-SCH detection. The timing information, obtained in the P-SCH detection stage, is fed to the FFT 7. A control unit 10, using information about what kind of cell search it is (initial, intrafrequency neighbour (NB) or interfrequency) decides how to do correlation according to the description below. That information is fed to a cell identity detection unit 11 that correlates the sub-carriers to the orthogonal codes.

The idea of the frequency error robust correlation technique is described below in a more detail. For exemplifying the correlation technique, cell ID detection in LTE cell search is used. However the invention is not limited to that case. Furthermore, a receiver receiving a signal with a frequency offset characterized by a parameter $\Delta$ is assumed.

Figure 4:
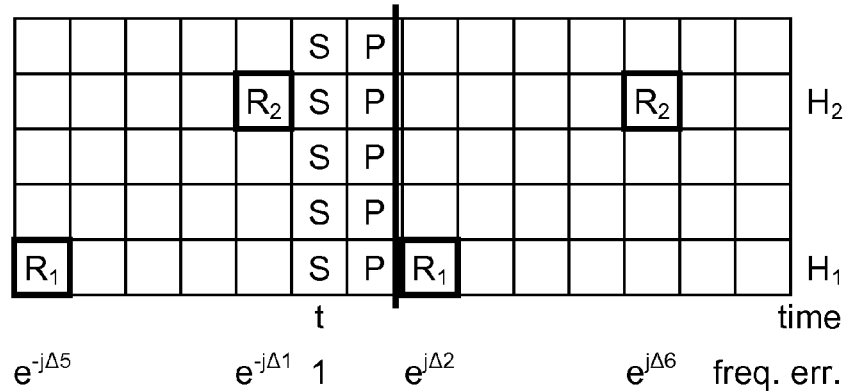
FIG. 4 shows a part of a Transport Time Interval (TTI) for LTE synchronization.

FIG. 4 shows a part of a Transport Time Interval (TTI) for LTE SCH, i.e. a TTI including P- and S-SCH symbols and reference symbols (RS). At the cell identity detection (Cell search stage 3) the P- and S-SCH are known symbols and therefore can be used for obtaining a channel estimate for the sub-carrier carrying the reference symbols, as it is well known in the art. After S-SCH detection the cell group specific scrambling code is detected and the signal is descrambled. While $H_i$ is the channel for sub-carrier i, the channel estimate for sub-carrier i at time t (the time instant for the S-SCH symbol) is labeled $\hat{H}_t^i$. Further, k can indicate the time instant (measured in symbols) for the reception of the reference symbols relative to the reception of the S-SCH symbol. In FIG. 4, k=-5 for the first reference symbol ($R_1$) of the TTI, -1, 2 and 6 for the following reference symbols. Thus, when $s_{RS_k^l}$ is the l:th orthogonal code applied on the reference symbol at time k and $e^{j\Delta k}$ is the channel rotation due to the frequency error (with phase 0 at time instant t, i.e. the phase rotation at time t is included in the radio channel at time t), the descrambled received signal $Y_{t+k}^i$ at subcarrier i at time t+k can be written as $$Y_{t+k}^i = H_i s_{RS_k^l} e^{j\Delta k} + e_t, \quad (1)$$

i.e. the transmitted code multiplied by the channel and channel rotation plus a noise contribution $e_t$. The channel estimate $\hat{H}_t^i$ can be used for equalizing the channel. Mathematically, that can be written according to $$\tilde{Y}_{t+k}^i = \frac{1}{\hat{H}_t^i} Y_{t+k}^i = \frac{1}{\hat{H}_t^i}\left(H_i s_{RS_k^l} e^{j\Delta k} + e_t\right) \approx s_{RS_k^l} e^{j\Delta k} + \varepsilon_t, \quad (2)$$

where $\tilde{Y}_{t+k}^i$ is the equalized version of $Y_{t+k}^i$ and $\varepsilon_t$ is noise. It is noted that division by the channel estimate is only one way of equalizing the channel. Another way could be to multiply with a matched filter, i.e. $\hat{H}^*$ as an example.

Having received and equalized the sequence $\tilde{Y}_{t+k}^i$, the cell identity can be found by correlating this sequence with each one of the possible orthogonal sequences $s_{RS_k^l}$ and selecting the largest correlation result.

This correlation can e.g. be performed by multiplying the complex conjugate of each possible orthogonal sequence $s_{RS_k^l}$ with the received and equalized sequence $\tilde{Y}_{t+k}^i$. When correlating with the correct sequence (l), the amplitude of the correlation result will be $$D_{RS} = \left|\sum_{k=-n}^{n} s_{RS_k^l}^* \tilde{Y}_{t+k}^i\right| = \left|\sum_{k=-n}^{n} s_{RS_k^l}^* s_{RS_k^l} e^{j\Delta k} + e_t\right| = \left|\sum_{k=-n}^{n} e^{j\Delta k} + e_t\right|, \quad (3)$$

since $s_{RS_k^l}$ multiplied by its complex conjugate equals one. It is noted that in the case where $s_{RS_k^l}$ is real, $s_{RS_k^l}$ is equal to $s_{RS_k^l}^*$. In the equation, n refers to the number of values for k mentioned above, i.e. in the example of FIG. 4 there were four values (-5, -1, 2, and 6), and thus n=2.

Figures 5A, 5B:
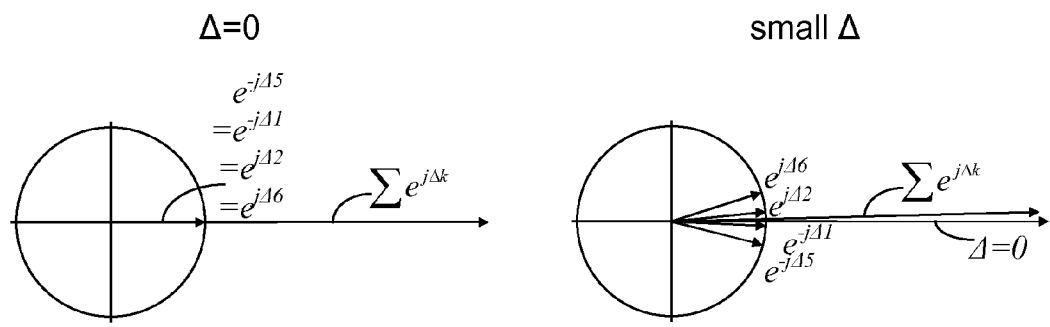
FIGS. 5a-5d illustrate phase shifts between reference symbols for different frequency errors.

Ideally, if there is no frequency error ($\Delta$=0), $D_{RS}$ for the correct sequence will approach the value 2n, while the correlation result for the other possible sequences (due to the sequences being orthogonal) will be zero, or at least low if noise is considered. However, if $\Delta$ is large the phase shift can be large between the first and last reference symbol, implying $D_{RS}$ will become low. This is illustrated in FIGS. 5a to 5d, which still refer to the situation of FIG. 4. FIG. 5a shows the situation when $\Delta$=0. In this case all four values of $e^{j\Delta k}$ are identical with zero phase shift, and the correlation result represented by the sum of the four values thus equals four times this value, i.e. the value 2n as mentioned above. In the following figures, positive values of $\Delta$ are assumed, which means that the phase shift for reference symbols received before the secondary synchronization signal (i.e. time t) will be negative, and correspondingly the phase shift for reference symbols received after the secondary synchronization signal will be positive. However, negative values of $\Delta$ could have been used as well.

FIG. 5b illustrates a relatively small value of $\Delta$. It is seen that the four values of $e^{j\Delta k}$ are no longer identical, since there is a phase change between them. However, the effect on the correlation result represented by the sum of the four values is still very limited compared to the correlation result for $\Delta$=0.

Figures 5C, 5D:
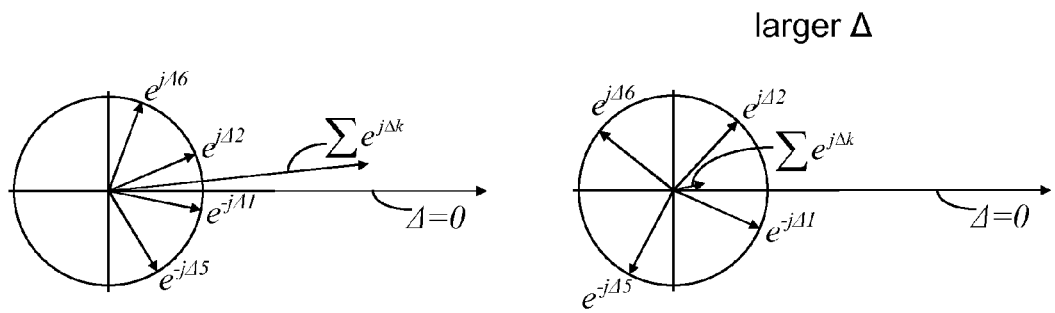

In FIG. 5c a larger value of $\Delta$ illustrated. The amplitude of the correlation result is now considerably reduced compared to the correlation result for $\Delta$=0, but it is still large enough to be distinguished from noise.

FIG. 5d, however, shows a situation with an even larger value of $\Delta$. Here, the amplitude of the correlation result is reduced so much compared to the correlation result for $\Delta$=0 that it can be very difficult to distinguish it from noise, and thus it is no longer possible to detect the used sequence by correlating the received sequence with the possible sequences. Since the correlation result for the other sequences ideally (i.e. if no frequency error is involved) is zero (and low if assuming noise) there will be risk of mixing the correct sequence with the non-correct ones. Hence pure correlation does not work for high frequency errors.

Now, since the channel is equalized with the channel estimate obtained in the middle of the RS sequence, the phase shift is positive on one side of the channel estimate (time>t if $\Delta>0$) and negative on the other side (time<t). Thus by correlating with $\tilde{Y}$ for negative (i.e. reference symbols received before the secondary synchronization signal) and $\tilde{Y}^*$ (the conjugate) for positive values (i.e. reference symbols received after the secondary synchronization signal) or vice versa, a correlation result more robust against frequency errors is obtained. It is noted that when the possible orthogonal sequences $s_{RS_k}{}^i$ are complex, the values of these sequences that are correlated with $\tilde{Y}^*$ should also be conjugated to ensure that the $s_{RS_k}{}^i$ values are still multiplied by their complex conjugates in the correlation sums. Thus, since $(s_{RS_k}{}^{i*})^*=s_{RS_k}{}^i$, the modified correlation result will be $$D_{RS} = \left| \sum_{k=-n}^{-1} s^*_{RS_k^i} \tilde{Y}^i_{t+k} + \sum_{k=1}^{n} s_{RS_k^i} (\tilde{Y}^i_{t+k})^* \right| = \left| \sum_{k=-n}^{n} e^{j\Delta|k|} + e_t \right|. \quad (4)$$

It is noted that since $s_{RS_k}{}^i=(s_{RS_k}{}^{i*})^*$, equation (4) can also be written in the following ways, and an implementation can be based on any one of them:

$$D_{RS} = \left| \sum_{k=-n}^{-1} s^*_{RS_k^i} \tilde{Y}^i_{t+k} + \sum_{k=1}^{n} (s^*_{RS_k^i})^* (\tilde{Y}^i_{t+k})^* \right| = \left| \sum_{k=-n}^{n} e^{j\Delta|k|} + e_t \right|, \quad (4a)$$

$$D_{RS} = \left| \sum_{k=-n}^{-1} s^*_{RS_k^i} \tilde{Y}^i_{t+k} + \sum_{k=1}^{n} \left( s^*_{RS_k^i} \tilde{Y}^i_{t+k} \right)^* \right| = \left| \sum_{k=-n}^{n} e^{j\Delta|k|} + e_t \right|, \quad (4b)$$

$$D_{RS} = \left| \sum_{k=-n}^{-1} s^*_{RS_k^i} \tilde{Y}^i_{t+k} + \left( \sum_{k=1}^{n} s^*_{RS_k^i} \tilde{Y}^i_{t+k} \right)^* \right| = \left| \sum_{k=-n}^{n} e^{j\Delta|k|} + e_t \right|. \quad (4c)$$

Figure 6A:
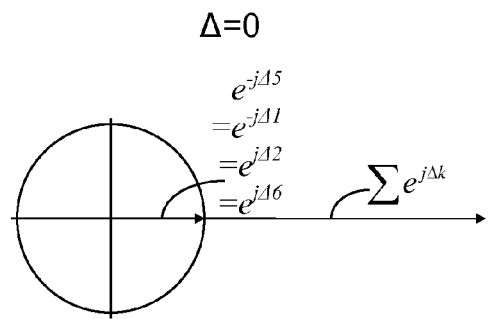
FIGS. 6a-6d illustrate phase shifts when a part of the reference symbols have been conjugated for the same frequency errors.
Figure 6B:
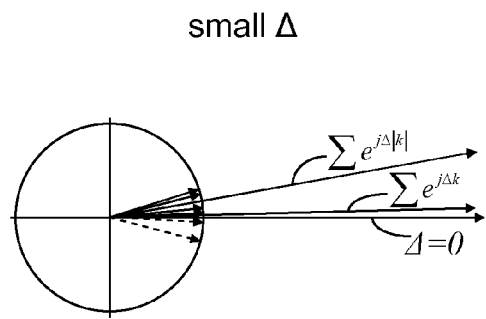
Figure 6C:
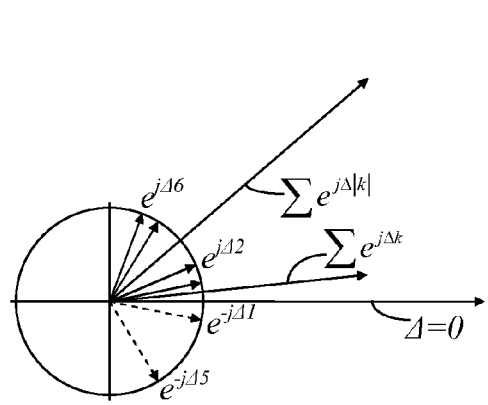
Figure 6D:
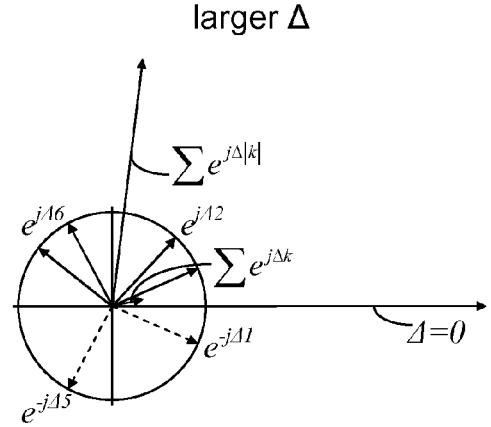

This is illustrated in FIGS. 6a to 6d, which show the same situations as FIGS. 5a to 5d, except that two of the four values of $e^{j\Delta k}$ have now been conjugated. As shown in FIG. 6a there is no difference for $\Delta=0$, since all four values of $e^{j\Delta k}$ are identical with zero phase shift. In FIG. 6b it is seen that even for small values of $\Delta$ the amplitude of the modified correlation result is increased a bit. Thus, although in this case the normal correlation result was sufficient, there is a positive effect of the idea also in this situation. When the value of $\Delta$ is increased, as shown in FIG. 6c, the improvement becomes more evident, because in this figure the amplitude of the modified correlation result is considerably increased compared to the normal correlation method. In FIG. 6d we have a situation where it would hardly have been possible to detect the used sequence with the normal correlation method (as it was also illustrated in FIG. 5d), since it was difficult to distinguish the correlation result from noise. It is clearly seen in FIG. 6d that in this case the correlation result is considerably increased when some of the received reference symbols are complex conjugated before they are correlated with the possible sequences.

In the above example, the received symbols with negative phase change have been conjugated. However, the result would be similar if those with positive phase change had been conjugated. Further, in the described example, there are the same number of reference symbols before and after the channel estimate time. This, however, needs not be the case. It is not even necessary to complex conjugate all the received symbols having either a positive or a negative phase change. It can be seen from e.g. FIG. 6d that an improvement would have been obtained even when only one of the received symbols had been conjugated, although the result is of course improved when all symbols with the same sign of the phase change are conjugated.

Returning now to the block diagram of FIG. 3, which shows an example of a receiver circuit in which the modified correlation method described above can be used, the correlation steps are performed in the cell detection unit 11. The control unit 10 decides whether the correlation in unit 11 shall be performed as a normal correlation or according to the method described above. As one example, this decision may be made based on the type of cell search currently taking place. In case of e.g. intrafrequency neighbour or interfrequency cell search, the traditional correlation can be used, because the frequency error is known to be relatively small, i.e. <200 Hz, while the new method can be used for initial cell search, where the frequency error can be much larger, i.e. in the kHz range. Another possibility is to obtain an indication of the level of the actual frequency error, which can be done under use of the already known secondary synchronization signal. Thus as an example, the conjugated correlation can be used, if a frequency error above a predefined threshold is indicated, and traditional correlation can be used, if a frequency error below said threshold is indicated.

Figure 7:
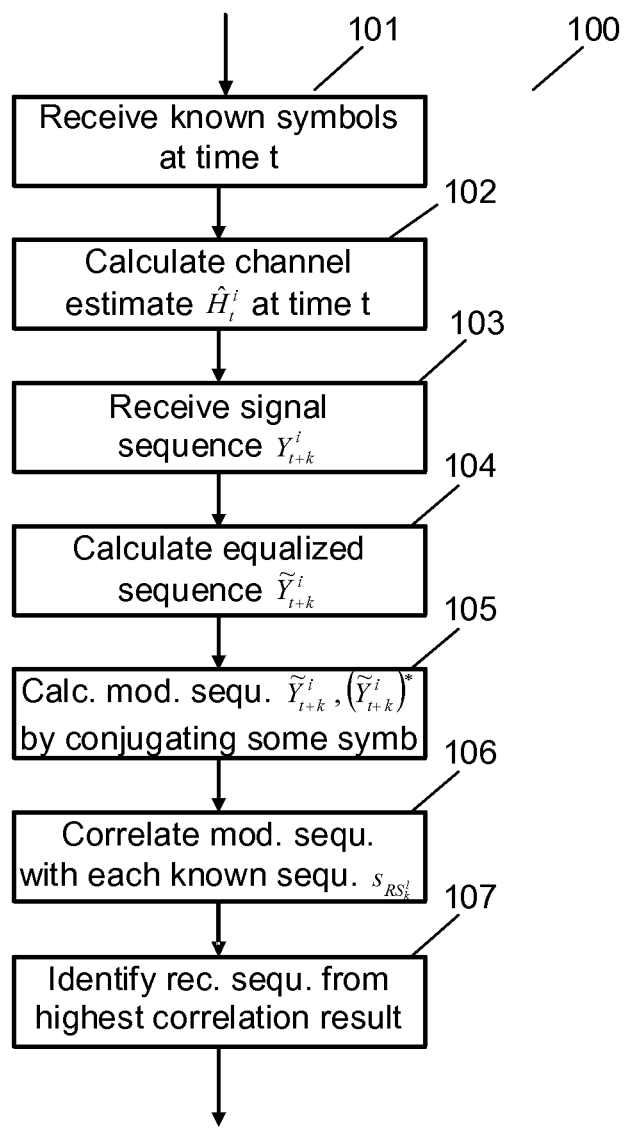
FIG. 7 shows a flow chart illustrating the steps of a method for identifying a sequence of received signals.

A flow chart 100 illustrating the procedure described above is shown in FIG. 7. First, in step 101, a number of known signals are received at time t. In the case of 3G LTE cell search, these known signals can be the primary and/or secondary synchronization signals (P-SCH and/or S-SCH), and the time t can be the time instant for the S-SCH symbol. Next, in step 102, these known signals are used for calculating a channel estimate $\hat{H}_t^i$ for sub-carrier i at time t. In step 103 the descrambled signal sequence $Y_{t+k}{}^i$ is received at sub-carrier i at the times t+k. The received sequence $Y_{t+k}{}^i$ has originally been sent from a transmitter as one out of a number of known orthogonal sequences $s_{RS_k}{}^i$. In the 3G LTE case this sequence is the reference symbols as indicated in FIG. 4. In step 104 the channel estimate $\hat{H}_t^i$ can be used for equalizing the received sequence. The equalized sequence is labelled $\tilde{Y}_{t+k}{}^i$.

In step 105, some of the signals in the equalized sequence $\tilde{Y}_{t+k}{}^i$ are then complex conjugated as described above and illustrated in FIGS. 6a-6d. The modified sequence that is the result of this step is then used for correlation with each one of the known orthogonal sequences $s_{RS_k}{}^i$ in step 106. As mentioned above, when the values of the known orthogonal sequences are complex, this step also includes conjugating those $s_{RS_k}{}^i$ values that are correlated with conjugated $\tilde{Y}_{t+k}{}^i$ values. Finally, in step 107, the received sequence is identified as that one of the known orthogonal sequences giving the highest correlation result.

It is noted that in some applications the equalization might not be needed, and in such case steps 101, 102 and 104 can be omitted.

Figure 8:
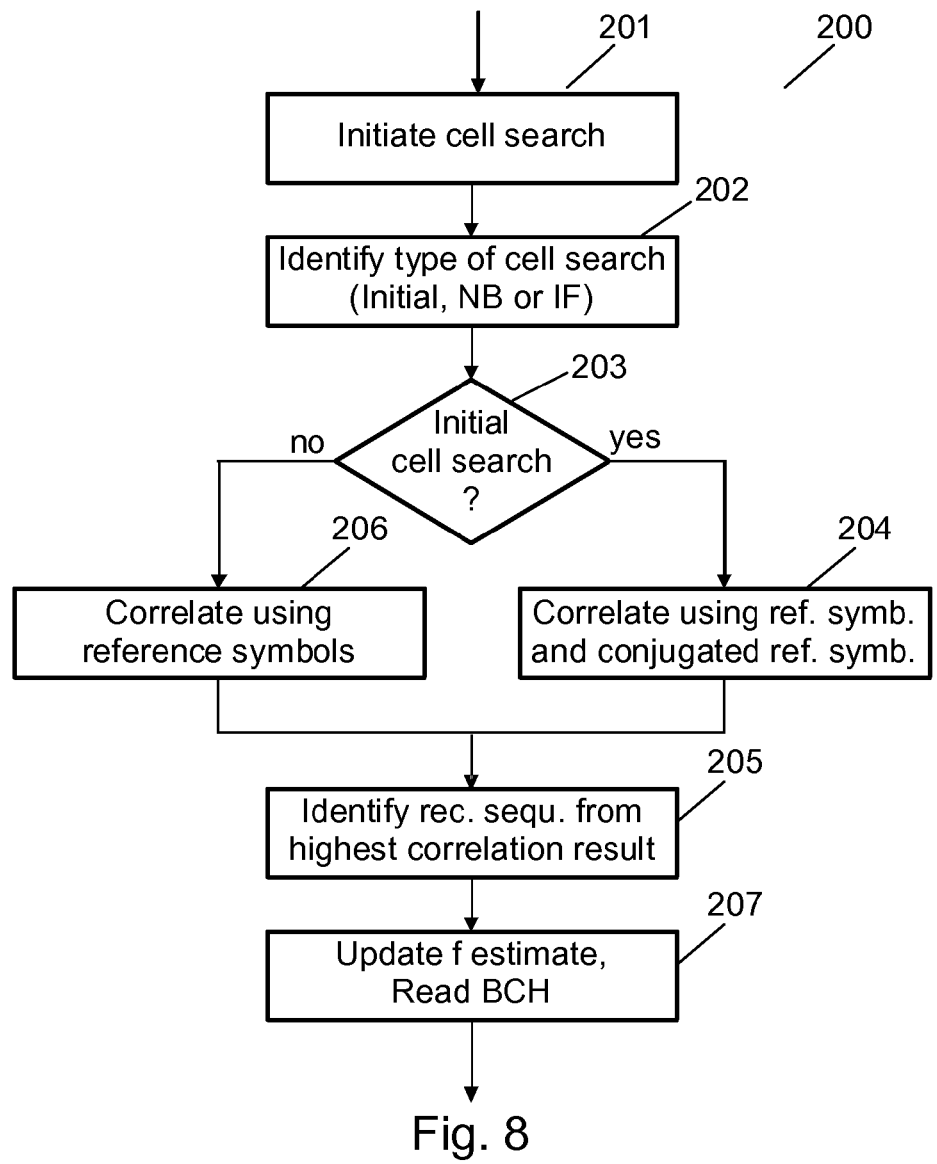
FIG. 8 shows a flow chart illustrating a 3G LTE cell search in which the method of FIG. 7 is used.

As mentioned, this correlation method can be used for many applications, one of which is the 3G LTE cell search. A flow chart 200 illustrating an example of the use in 3G LTE cell search is shown in FIG. 8.

First, in step 201, the cell search is initiated. This step includes the first two steps of the proposed cell search scheme mentioned above (i.e. the detection of P-SCH and S-SCH). In step 202 the type of the cell search is identified, which can be initial cell search, intrafrequency neighbour cell search or interfrequency cell search. If the cell search is initial (step 203), a correlation is performed in step 204 using a combination of reference symbols and conjugated reference symbols, and in step 205 the cell identity is detected by identifying that one of the known orthogonal sequences giving the highest correlation result. Steps 204 and 205 correspond to the steps of the flow chart 100 shown in FIG. 7.

If, however, the cell search is not initial, a correlation is performed in step 206 using the reference symbols as received, i.e. not with some of them conjugated, and as before, the cell identity is detected in step 205. After this, a frequency estimate may be updated, and the broadcast channel (BCH) can be read to receive cell specific system information in step 207.

Although various embodiments of the present invention have been described and shown, the invention is not restricted thereto, but may also be embodied in other ways within the scope of the subject-matter defined in the following claims.

The invention claimed is:

1. A method of identifying, by a receiver of signals transmitted via a channel of a wireless communications system, a sequence of received signals as one of a number of known orthogonal sequences, comprising the steps of:
   receiving said sequence of received signals serially over a given time interval;
   receiving, in addition to said sequence of received signals, at least one known signal at a time instant in said given time interval;
   dividing said sequence of received signals into a first part comprising signals received before said time instant and a second part comprising signals received after said time instant, wherein the signals in the first part are distorted by a phase shift having a first polarity, and the signals in the second part are distorted by a phase shift having a second polarity that is opposite that of the first polarity;
   calculating from said sequence of received signals a modified received sequence by replacing at least one of the received signals from one of said parts by their complex conjugate values;
   correlating the modified received sequence with each one of the number of known orthogonal sequences to obtain a correlation result for each of said known sequences; and
   identifying the sequence of received signals as the known orthogonal sequence having the largest correlation result.

2. A method according to claim 1, wherein the correlating step comprises:
   calculating for each of said known orthogonal sequences a modified known sequence by replacing signals corresponding to the replaced received signals by their complex conjugate values; and
   correlating the modified received sequence with each modified known sequence to obtain said correlation results.

3. A method according to claim 1, further comprising:
   calculating from said known signal an estimate of said channel at said time instant; and
   equalizing said sequence of received signals using said channel estimate.

4. A method of determining, by a receiver of signals transmitted via a channel of a wireless communications system, a cell identity by a cell search algorithm, wherein the cell identity is determined by identifying a sequence of received signals as one of a number of known orthogonal sequences according to the method of claim 1.

5. A method according to claim 4, wherein the receiver is a receiver of a Third Generation Long Term Evolution system.

6. A receiver of signals transmitted via a channel of a wireless communications system, said receiver being arranged to identify a sequence of received signals as one of a number of known orthogonal sequences, wherein the receiver is further arranged to:
   receive said sequence of received signals serially over a given time interval;
   receive, in addition to said sequence of received signals, at least one known signal at a time instant in said given time interval;
   divide said sequence of received signals into a first part comprising signals received before said time instant and a second part comprising signals received after said time instant, wherein the signals in the first part are distorted by a phase shift having a first polarity, and the signals in the second part are distorted by a phase shift having a second polarity that is opposite that of the first polarity;
   calculate from said sequence of received signals a modified received sequence by replacing at least one of the received signals from one of said parts by their complex conjugate values;
   correlate the modified received sequence with each one of the number of known orthogonal sequences to obtain a correlation result for each of said known sequences; and
   identify the sequence of received signals as the known (orthogonal) sequence having the largest correlation result.

7. A receiver according to claim 6, arranged to correlate the modified received sequence with the known orthogonal sequences by:
   calculating for each of said known orthogonal sequences a modified known sequence by replacing signals corresponding to the replaced received signals by their complex conjugate values; and
   correlating the modified received sequence with each modified known sequence to obtain said correlation results.

8. A receiver according to claim 6, further being arranged to:
   calculate from said known signal an estimate of said channel at said time instant; and
   equalize said sequence of received signals using said channel estimate.

9. A receiver according to claim 6 further being arranged to:
   determine an indication of a frequency error for signals transmitted via said channel; and
   calculate and correlate said modified received sequence in dependence of said indication.

10. A receiver according to claim 9, further being arranged to:
    calculate and correlate said modified received sequence, if said indication exceeds a predefined threshold; and
    correlate said sequence of received signals with each one of the number of known orthogonal sequences to obtain a correlation result for each of said known sequences otherwise.

11. A receiver according to claim 6, further being arranged to determine a cell identity by a cell search algorithm from the identification of a sequence of received signals as one of a number of known orthogonal sequences.

12. A receiver according to claim 11, wherein the receiver is a receiver of a Third Generation Long Term Evolution system.

13. A receiver according to claim 11, further being arranged to:
- determine a type of said cell search algorithm; and
- calculate and correlate said modified received sequence in dependence of said type.

14. A receiver according to claim 13, further being arranged to:
- calculate and correlate said modified received sequence, if said cell search algorithm is an initial search algorithm; and
- correlate said sequence of received signals with each one of the number of known orthogonal sequences to obtain a correlation result for each of said known sequences otherwise.

15. A computer readable nontransitory storage medium having stored thereon program code for performing a method when said program code is run on a computer, wherein the method is a method of identifying, by a receiver of signals transmitted via a channel of a wireless communications system, a sequence of received signals as one of a number of known orthogonal sequences, comprising the steps of:
- receiving said sequence of received signals serially over a given time interval;
- receiving, in addition to said sequence of received signals, at least one known signal at a time instant in said given time interval;
- dividing said sequence of received signals into a first part comprising signals received before said time instant and a second part comprising signals received after said time instant, wherein the signals in the first part are distorted by a phase shift having a first polarity, and the signals in the second part are distorted by a phase shift having a second polarity that is opposite that of the first polarity;
- calculating from said sequence of received signals a modified received sequence by replacing at least one of the received signals from one of said parts by their complex conjugate values;
- correlating the modified received sequence with each one of the number of known orthogonal sequences to obtain a correlation result for each of said known sequences; and
- identifying the sequence of received signals as the known orthogonal sequence having the largest correlation result.

* * * * *

UNITED STATES PATENT AND TRADEMARK OFFICE
CERTIFICATE OF CORRECTION

PATENT NO.        : 8,509,104 B2                     Page 1 of 1
APPLICATION NO.   : 12/810839
DATED             : August 13, 2013
INVENTOR(S)       : Lindoff It is certified that error appears in the above-identified patent and that said Letters Patent is hereby corrected as shown below:

On the Title Page, in Item (73), under "Assignee", in Column 1, Line 1,
    delete "Ericsson," and insert -- Ericsson (publ), --, therefor.

Signed and Sealed this
Twenty-fifth Day of March, 2014

Michelle K. Lee
*Deputy Director of the United States Patent and Trademark Office*